United States Patent
Moon et al.

(10) Patent No.: US 9,804,801 B2
(45) Date of Patent: Oct. 31, 2017

(54) HYBRID MEMORY DEVICE FOR STORING WRITE DATA BASED ON ATTRIBUTION OF DATA STORED THEREIN

(71) Applicant: SAMSUNG ELECTRONICS CO., LTD., Suwon-si, Gyeonggi-do (KR)

(72) Inventors: Sangkwon Moon, Pyeongtaek-si (KR); Jin-Soo Kim, Seoul (KR); Young-Sik Lee, Dangjin-si (KR); Jinkyu Jeong, Suwon-si (KR); Kyung Ho Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 230 days.

(21) Appl. No.: 14/667,242

(22) Filed: Mar. 24, 2015

(65) Prior Publication Data

US 2015/0278104 A1 Oct. 1, 2015

(30) Foreign Application Priority Data

Mar. 26, 2014 (KR) .................. 10-2014-0035146

(51) Int. Cl.
| | | |
|---|---|---|
| *G06F 12/00* | (2006.01) | |
| *G06F 13/00* | (2006.01) | |
| *G06F 3/06* | (2006.01) | |

(52) U.S. Cl.
CPC .............. *G06F 3/068* (2013.01); *G06F 3/065* (2013.01); *G06F 3/0611* (2013.01); *G06F 3/0656* (2013.01); *G06F 2003/0691* (2013.01)

(58) Field of Classification Search
CPC ...... G06F 12/12; G06F 12/121; G06F 12/122; G06F 12/123; G06F 12/124; G06F 12/126
See application file for complete search history.

(56) References Cited

U.S. PATENT DOCUMENTS

| | | | |
|---|---|---|---|
| 8,266,393 B2 | 9/2012 | Moscibrod et al. | |
| 8,266,407 B2 | 9/2012 | Karamcheti et al. | |
| 8,271,745 B2 | 9/2012 | Ware | |

(Continued)

OTHER PUBLICATIONS

Jaemin Jung et al., "FRASH: Exploiting Storage Class Memory in Hybrid File System for Hierarchical Storage", Submitted to ACM Transactions on Storage, p. 1-24.

(Continued)

*Primary Examiner* — Sean D Rossiter
(74) *Attorney, Agent, or Firm* — Volentine & Whitt, PLLC

(57) ABSTRACT

A method of processing data in a memory system including a control unit and a hybrid memory device having a first memory and a second memory, includes; receiving first write data, storing the first write data in the first memory and assigning a first group state from among a plurality of group states to the stored first write data in response to first attribution information, completing a data processing operation in the memory system directed to the stored first write data that changes the attribution information associated with the stored first write data by monitoring of the first attribution information using an operating system running on the memory controller, and changing the first group state assigned to the stored first write data to a second group state from among the plurality of group states, the second group state having a different priority than a priority for the first group state.

14 Claims, 9 Drawing Sheets

(56) References Cited

U.S. PATENT DOCUMENTS

| | | | |
|---|---|---|---|
| 8,321,652 B2 | 11/2012 | Hinz | |
| 8,407,377 B1 | 3/2013 | Shapiro et al. | |
| 8,700,830 B2 | 4/2014 | Hasan et al. | |
| 2005/0160236 A1* | 7/2005 | Tierney | G06F 12/0831 711/144 |
| 2005/0204113 A1 | 9/2005 | Harper et al. | |
| 2005/0246487 A1* | 11/2005 | Ergan | G06F 3/061 711/113 |
| 2006/0143396 A1* | 6/2006 | Cabot | G06F 12/121 711/134 |
| 2007/0266207 A1* | 11/2007 | Moyer | G06F 12/0864 711/128 |
| 2010/0106895 A1 | 4/2010 | Condit et al. | |
| 2011/0055495 A1 | 3/2011 | Wolford et al. | |
| 2011/0208933 A1 | 8/2011 | Selfin et al. | |
| 2011/0252201 A1* | 10/2011 | Koren | G06F 11/1448 711/135 |
| 2012/0079174 A1 | 3/2012 | Nellans et al. | |
| 2015/0095589 A1* | 4/2015 | Park | G06F 12/122 711/141 |
| 2015/0199277 A1* | 7/2015 | Kipp | G06F 12/0888 711/135 |
| 2015/0341724 A1* | 11/2015 | Pedersen | H04R 5/04 381/300 |
| 2015/0370715 A1* | 12/2015 | Samanta | G06F 11/00 711/113 |
| 2017/0024323 A1* | 1/2017 | Havlir | G06F 12/0875 |

OTHER PUBLICATIONS

Alan Bivens et al., "Architectural Design for Next Generation Heterogeneous Memory Systems", 2010 IEEE, p. 1-4.

Venkatesh Pallipadi et al., "PATting Linux", Reprinted from the Proceedings of the Linux Symposium, Jul. 23-26, 2008, p. 135-143.

Eunji Lee et al., "Shortcut-JFS: A Write Efficient Journaling File System for Phase Change Memory".

Sasha Ames et al., "LiFS: An Attribute-Rich File System for Storage Class Memories".

Wentong Li et al., "A Page-based Hybrid (Software-Hardware) Dynamic Memory Allocator".

* cited by examiner

| value | State |
|---|---|
| 0 | Normal |
| 1 | Unnecessary |

| value | State |
|---|---|
| 00 | Normal |
| 01 | Unnecessary |
| 10 | Pinned |
| 11 | Temporary |

HYBRID MEMORY DEVICE FOR STORING WRITE DATA BASED ON ATTRIBUTION OF DATA STORED THEREIN

CROSS-REFERENCE TO RELATED APPLICATIONS

This U.S. non-provisional patent application claims priority under 35 U.S.C. §119 to Korean Patent Application No. 10-2014-0035146 filed on Mar. 26, 2014, the subject matter of which is hereby incorporated by reference.

BACKGROUND

The present inventive concept relates generally to hybrid memory devices, memory systems including a hybrid memory device and data processing methods for such memory systems.

A great variety of contemporary computational systems includes one or more memory systems. There are many different memory system types and configurations, each having associated performance advantages and disadvantages. However, memory systems usually include at least one memory device storing data and a processor controlling the operation of the memory device.

Memory devices and their constituent memory cells may be broadly classified as being either volatile or non-volatile in their operative nature. Volatile memory devices, such as the Dynamic Random Access Memory (DRAM) and the Static RAM (SRAM), operate at relatively speeds, but lose stored data in absence of applied power. In contrast, non-volatile memory devices, such as the Electrically Erasable Programmable Read Only Memory (EEPROM) including flash memory, Ferroelectric RAM (FRAM), Phase-change RAM (PRAM), Resistance RAM (ReRAM) and Magnetic RAM (MRAM), operate at relatively slow speeds, but are able to retain stored data in the absence of applied power.

In particular, when a memory system is used as a main memory to receive externally-provided data and provide stored data to an external source, it is desirable for the memory system to receive/provide data using random data read/write method(s).

SUMMARY

Embodiments of the inventive concept provide a hybrid memory device. The hybrid memory device includes a first memory configured to store data; a second memory being accessed at a different operation speed than the first memory.

In one embodiment, the inventive concept provides a hybrid memory device comprising; a first memory operating according to a first speed and configured for use as a primary memory to receive and store data having assigned attribution information, a second memory operating according to a second speed different from the first speed, and a memory controller configured to perform a flush operation that secures additional free space in the first memory by copying data from the first memory to the second memory, wherein the memory controller classifies data during storage of the data in the first memory according to one of a plurality of group states in response to attribution information associated with the data, wherein the plurality of group states range from a lowest priority to a highest priority, and upon receiving a write data request including write data, the memory controller is further configured to determine whether sufficient free space exists in the first memory to store the write data, and upon determining that insufficient free space exists in the first memory, overwrites data assigned at least the lowest priority group state.

In another embodiment, the inventive concept provides a method of processing data in a memory system including a control unit and a hybrid memory device, the hybrid memory device including a memory controller, a first memory operating according to a first speed, and a second memory operating according to a second speed different from the first speed. The method comprises; receiving a first write data request including first write data and first attribution information associated with the first write data, storing the first write data in the first memory and assigning a first group state from among a plurality of group states to the stored first write data in response to the first attribution information, completing a data processing operation in the memory system directed to the stored first write data that changes the attribution information associated with the stored first write data by monitoring of the first attribution information using an operating system running on the memory controller, and changing the first group state assigned to the stored first write data to a second group state from among the plurality of group states, the second group state having a priority lower than a priority for the first group state.

In one embodiment, the inventive concept provides in a memory system including a control unit and a hybrid memory device, the hybrid memory device including a memory controller, a first memory operating according to a first speed, and a second memory operating according to a second speed different from the first speed, a method of re-allocating memory space in the first memory during execution of a write operation, comprises; referencing an attribute information table listing respectively assigned group states for first data, second data and third data stored in the first memory, wherein the first data is assigned a first priority group state, the second data is assigned a second group state having a priority lower than that of the first group state, and the third data is assigned a third group state having a priority lower than that of the second group state, in response to a received write data request including fourth data, determining whether sufficient free space exists in the first memory to store the fourth data, and upon determining that sufficient free space exists in the first memory to store the fourth data, storing the fourth write data in the first memory, else upon determining that sufficient free space does not exists in the first memory to store the fourth data, re-allocating memory space in the first memory by overwriting the third data with at least a portion of the fourth data.

BRIEF DESCRIPTION OF THE DRAWINGS

Certain embodiments of the inventive concept are illustrated in the accompanying drawings.

DETAILED DESCRIPTION

Figure 1:
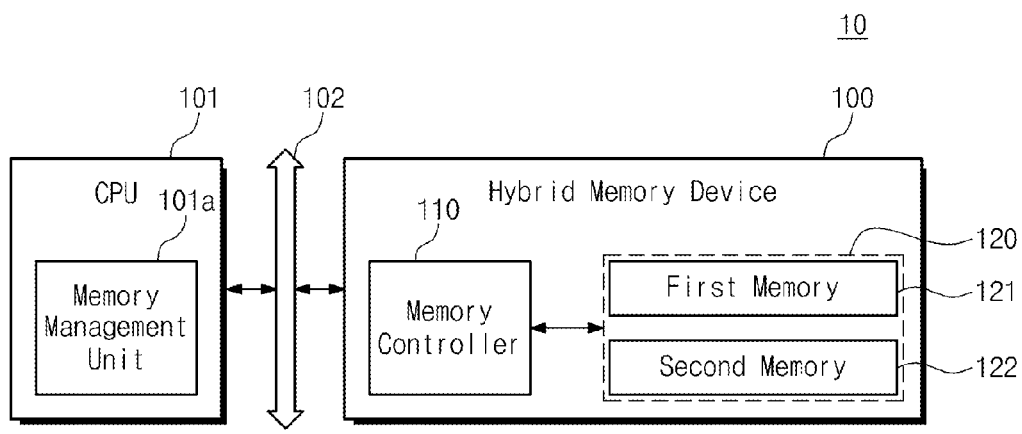
FIG. 1 is a block diagram illustrating a memory system according to an embodiment of the inventive concept.

The inventive concept now will be described more fully hereinafter with reference to the accompanying drawings, in which exemplary embodiments are shown. This exemplary embodiments may, however, be embodied in many different forms and should not be construed as limited to the embodiments set forth herein. Rather, these embodiments are provided so that this disclosure will be thorough and complete, and will fully convey the scope of the exemplary embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc., may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting of the exemplary embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which these exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure (FIG. 1 is a block diagram illustrating a memory system according to certain embodiments of the inventive concept. Referring to FIG. 1, a memory system 10 generally includes a control unit 101 and a hybrid memory device 100 operatively connected via a bus 102.

It is assumed for purposes of this written description that the memory system 10 manages data by a defined page unit, the "page" is a unit of data capable of being communicated (i.e., read or written) or processed during a given unit of time. However, the scope and technical characteristics of the inventive concept are not limited to only such memory systems. For example, the memory system 10 may manage data according to a multi-page unit, a block unit, a sector unit, or a cluster unit.

In the memory system 10, it is further assumed that the control unit 101 provide "attribution information" characterizing data processed by the hybrid memory device 100. The hybrid memory device 100 manages the flow of data in a manner that allows the storing of data by one or more memories among a plurality of memories (e.g., a first memory and a second memory), where each respective memory in the plurality of memories operates with different read/write characteristics in response to the attribution information provided by the control unit 101. Using this approach, the memory system 10 is able to efficiently and effectively execute data storage operation in accordance with the attribution information associated with data being "written to" or "read from" the hybrid memory device.

Thus, the control unit 101 controls the overall operation of the memory system 10, and may be implemented using a central processing unit (CPU), a microcontroller, or a specialized memory controller. The control unit 101 will usually operate under the control of one or more applications running in conjunction with an operating system. That is, the software resources used by the control unit 101 will usually include an operating system and at least one application, the combination of which providing the control functionality necessary to read data from and store data to the hybrid memory device 100.

As noted above, the control unit 101 may be connected to the hybrid memory device 100 via the bus 102. The bus 102 may include or be operated to provide an address bus, a control bus and/or a data bus. The control unit 101 of FIG. 1 is shown as including a memory management unit 101a capable of managing read/write operations with respect to the hybrid memory device 100.

With this configuration and under the foregoing assumptions, the memory management unit 101a will discriminate (or "check") the attribution information associated with certain "write data" to be stored in the hybrid memory device 100, and/or certain "read data" retrieved from the hybrid memory device 100. In certain embodiments of the inventive concept, the attribution information may be distinguished using a memory management function provided by an operating system running in conjunction with the operation of the control unit 101 and/or the memory controller 110.

Attribution information may be variously defined. For example, attribution information associated with data may include information indicating whether or not use of data is completed. Once indicted as having its "use completed", for example, the data may be marked as being explicitly free (i.e., not likely to be used thereafter). Thus, if use of certain "target data" stored in the hybrid memory device 100 is deemed completed, the memory management unit 101a will provide corresponding attribution information indicating same to the hybrid memory device 100, and the hybrid memory device 100 will mark the data according as use completed (e.g., no longer necessary or valid data).

The attribution information may include information indicating a priority of certain data within an established hierarchy of data priorities. For example, where data is identified as "cache data" (or temporary data), it may be assumed that corresponding original data exists somewhere in memory space. Thus, the memory management unit 101a may assign a low priority to such cache data.

In a case where certain data (i.e., programming code or data) is required to address an interrupt (generally referred to hereafter as "interrupt data"), the speed with which the interrupt data is processed will be closely linked to the overall performance of the memory system 10. Hence, the memory management unit 101a will assign interrupt data a high priority.

In this manner, an application running on the memory management unit 101a, for example, may readily distinguish and variably process data according to its assigned priority. Alternately, an application running on the memory management unit 101a may provide data together with corresponding attribution information that establishes a priority for associated data, where such priority indication follows the data through the operations of being written to and read from the hybrid memory device 100.

In FIG. 1, the memory management unit 101a is illustrated as an internal block of the control unit 101. However, the memory management unit 101a may be variously embodied in hardware, firmware and/or software. Thus, some portion of, or all of the functions performed by the memory management unit 101a may be performed by one or more function units generally provided by the resources of the control unit 101, a multiplicity of integrated circuits operating in conjunction with the control unit 101, and/or associated external circuitry. Thus, the functionality provided by the memory management unit 101a may be practically embodied using a chipset including the control unit 101. In certain embodiments of the inventive concept, some of the function(s) provided by the memory management unit 101a will be embodied by programming code associated with the constituent operating system.

The hybrid memory device 100 may be used as a main memory component of the memory system 10 shown in FIG. 1. As such, the hybrid memory device 100 will directly exchange data with the control unit 101, and may be used to store programming code required to operate the control unit 101.

In FIG. 1, the hybrid memory device 100 includes a memory controller 110 and a memory unit 120, where the memory unit 120 includes first and second memories 121 and 122. Those skilled in the art will understand that this is merely a simple example and that the scope of the inventive concept subsumes much more complex memory units including multiple memories, potentially operating in response to multiple data communication channels and according to different read/write characteristics.

Thus, in relation to FIG. 1, the first and second memories 121 and 122 are assumed to be heterogeneous memories having different operating speeds. That is, the first memory 121 is assumed to provide faster data access (read/write) speeds than the second memory 122, but the second memory 122 is assumed to provide greater data storage capacity (or memory space) than the first memory 121.

Either one or both of the first and second memories 121 and 122 may be embodied by one or more of DRAM, FRAM, PRAM, MRAM or ReRAM.

Further, one or both of the first and second memories 121 and 122 may include memory cells configured to operate as single-level memory cells (SLC) capable of storing one bit per memory cell and/or multi-level memory cells (MLC) capable of storing two or more bits per memory cell.

The memory controller 110 is configured to first store received write data in the first memory 121 in response to a write request received from the control unit 101. However, once the "used space" (i.e., memory space currently allocated to store data) of the first memory 121 reaches a predetermined "flush limit", the memory controller 110 will cause a "flush operation" to be executed with respect to the first memory 120. During a flush operation, identified "flush data" is copied from the first memory 121 and stored in the second memory 122. Once the flush data has been successfully copied to the second memory 122, the corresponding memory space previously used by the first memory 121 to store the flush data may be reallocated as "free space", thereby securing more available free space within the first memory 121.

It is possible for the memory controller 110 to perform a flush operation before the used space of the first memory 121 reaches flush limit. For example, the memory controller 110 may periodically perform a flush operation on identified flush data in the first memory 121. Further, the memory controller 110 may cause execution of a flush operation once a count of executed commands (e.g., write commands) exceeds a threshold number. Still further, a flush operation may be performed in response to certain "data arrangement" or "memory space allocation" requests received from the control unit 101. Such requests may be variously indicated, such as by provision of a corresponding command, a bit setting, etc.

As previously noted, the memory controller 110 may receive attribution information associated with certain data from the memory management unit 101a, and manage the writing of data to or the reading of data from the first memory 121 in response to the attribution information. For example, the memory controller 110 may classify (or mark) data stored in the first memory 121 according to one of several groups in response to the received attribution information. Memory controller 110 may then differently process data according to its assigned group during execution of flush operation. This is certainly true for data marked as use-completed which will usually be overwritten or reallocated as free space at an earliest opportunity by the memory controller 110.

In these manners, as working examples, the memory system 10 may manage data stored in the first memory 121 using the attribution information associated with the data to effectively facilitate the execution of data access operations.

Figure 2:
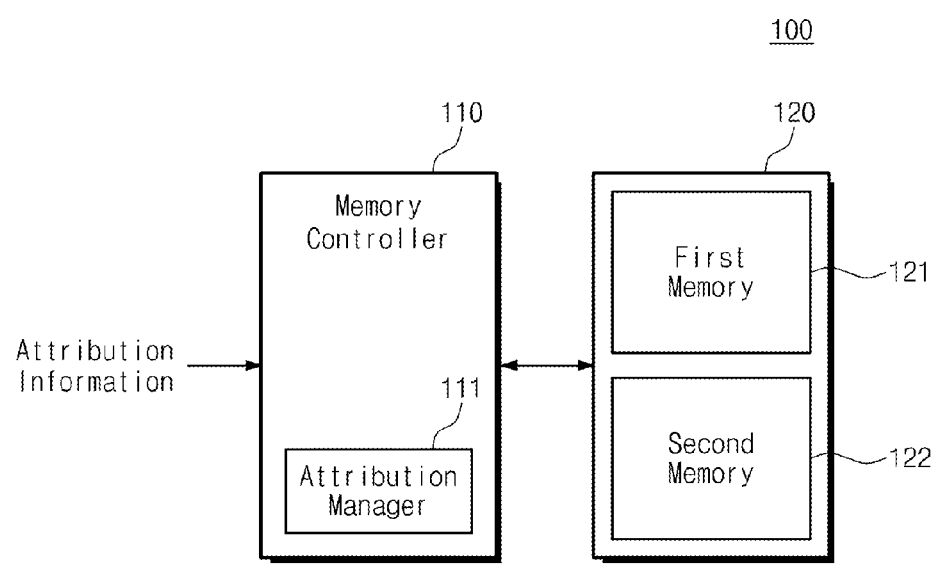
FIG. 2 is a block diagram further illustrating the hybrid memory device 100 of FIG. 1.

FIG. 2 is a block diagram further illustrating the hybrid memory device 100 of FIG. 1 including the memory controller 110 and memory unit 120.

Here, the memory controller 110 includes an attribution manager 111 capable of controlling the data access (write and/or read) use of the memory unit 120 in response to externally provided attribution information. In this regard, the attribution manager 111 may be used to assign and/or discriminate a "group state" for stored data according to a defined set of groups, each group be characterized by the attribution information. For example, the attribution manager 111 may mark and track data according to its group state (or classification indication or classification use, etc.) using a data table accessible to the memory controller 110.

Thus, in one example, the attribution manager 111 may mark certain data as being "use-completed data" in response to associated attribution information. Thereafter, the attribution manager 111 may enable an overwrite (or re-allocation) of the data to create additional free space without necessarily executing a flush operation in response to a data access request. This is just one example of many, wherein the attribution manager 111 may mark certain data with a low priority (or even a "no priority") in response to attribution information. Further, data marked as having a sufficiently low priority may be directly treated as free memory space subject to being overwritten without execution of a specific re-allocation operation such as a flush operation.

Thus, if additional memory space is required in the first memory 121 for execution of a particular operation, the attribution manager 111 may overwrite memory space currently storing data marked with a priority lower than a given priority level. And this overwriting of low priority data may be performed without necessarily executing a memory space re-allocation operation such as the flush operation.

Additionally, the attribution manager 111 may mark (or "pin") certain data with a high priority in response to data attribution information. Data marked as high priority may thereafter be allocated preferential memory space, such as the first memory 121 or some designated portion thereof. Thereafter, data marked as high priority may not be designated as flush data even when the used space of the first memory 121 reaches the flush limit.

Figure 3:
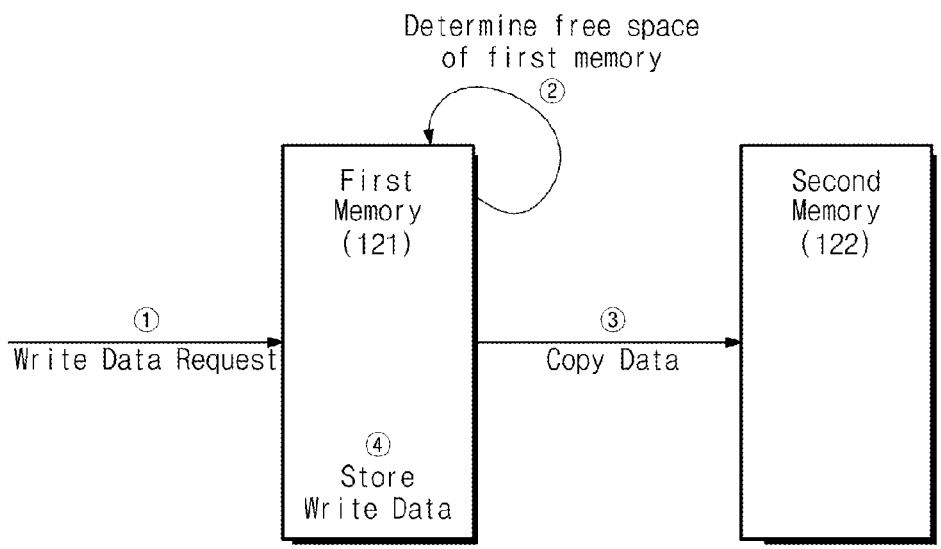
FIGS. 3 and 4 are operational diagrams illustrating particular operations of the hybrid memory device of FIG. 2.
Figure 4:
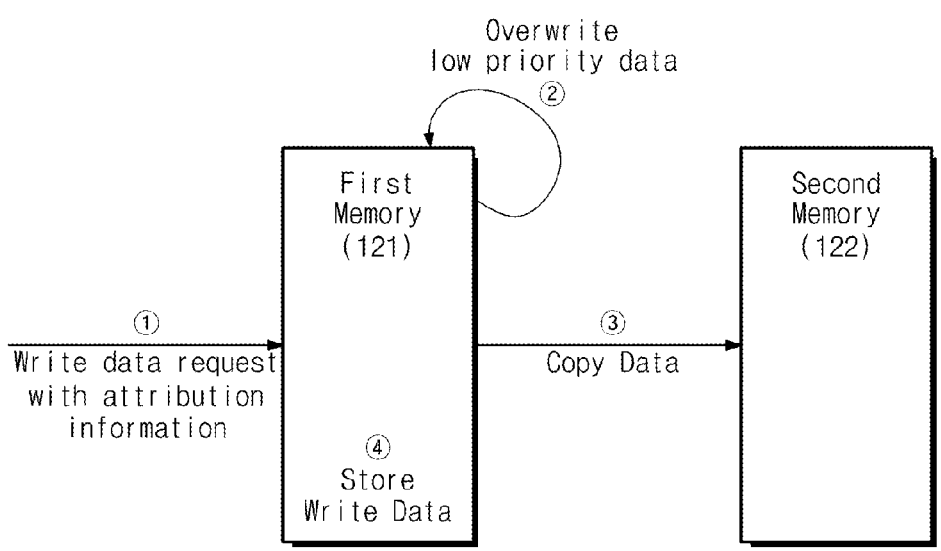

FIGS. 3 and 4 are operational diagrams illustrating particular operations of the hybrid memory device of FIG. 2. Referring to FIG. 3, a flush operation is performed with respect to the first memory 121 in response to a write data request.

Thus, in relation to an externally-provided write data request (e.g., from the control unit 101) ①, the hybrid memory device 100 receives a body of write data, and stores the write data in the first (primary) memory 121. However, in order to actually store the received write data in the first memory 121, the hybrid memory device 100 must first determine whether or not sufficient free space is available in the first memory 121 ②.

Assuming sufficient free space does not exist, the hybrid memory device 100 executes a flush operation that copies some or all of the data currently stored by the first memory 121 to the second memory 122 ③. Thereafter, the hybrid memory device 100 may secure (or re-allocate) the memory space occupied by the flush data in the first memory 121 as free space. And now that sufficient free space is available, the hybrid memory device 100 may store the received write data in the first memory 121 ④. In this manner, a hybrid memory device may execute, in response to an indicated size of incoming write data and further in response to a currently available free space in the first memory 121, a flush operation with respect to the first memory 121.

Alternately, as described above, a flush operation with respect to the first memory 121 may be executed under a predetermined condition before the available free space falls below a flush level.

Referring to FIG. 4, the hybrid memory device 100 again receives a write data request together with write data and also associated attribution information. Here, the hybrid memory device 100 may more effectively perform a write data operation in view of the received attribution information.

Accordingly, the externally-provided write data request including attribution information is received ①.

In response, the hybrid memory device 100 seeks to store the write data in the first (primary) memory 121. However, as before, a preliminary determination regarding available free space in view of the incoming write data must be made. Assuming this determination indicates that insufficient free space exists relative to the incoming write data, the hybrid memory device 100 may immediately cause low priority data (e.g., data marked use-completed) stored in the first memory 121 to be overwritten by some portion of the incoming write data ②. (In contrast, if sufficient free space is determined to exist in the first memory 121, the hybrid memory device 100 may immediately stores the incoming write data in the first memory 121 ④). As part of this step, the hybrid memory device 100 will mark the write data, when stored, according to (e.g.,) a group state in response to attribution information. Exemplary group states may include pinned, normal, temporary and use-completed).

Further, if sufficient free space does not exist after overwriting low priority data ②, then the hybrid memory device 100 may execute a flush operation that copies some or all of the data stored in the first memory 121—data capable of being marked as flush data—into the second memory 122 ③. That is, data currently stored in the first memory 121 may be marked as flush data according to its assigned priority in order to re-allocate memory space in the first memory 121 sufficient to store the incoming write data.

In the foregoing, an operation determining the available of free space in the first memory 121 is performed both before overwriting the low priority data and before executing the flush operation. However, this need not always be the case. For example, a single "free space checking" operation may be performed in response to a write data request that returns information regarding current free space and available free space following overwrite of low priority data.

Thus, according to certain embodiments of the inventive concept, a hybrid memory device may write incoming write data to a primary memory by overwriting low priority data (e.g., data marked use-completed) without necessarily executing a flush operation. Thus, since the management of incoming write data may be accomplished in view of attribution information associated with data already stored in the primary memory, the overall number of flush operations executed may be reduced, thereby increasing memory system performance.

Figures 5, 6:
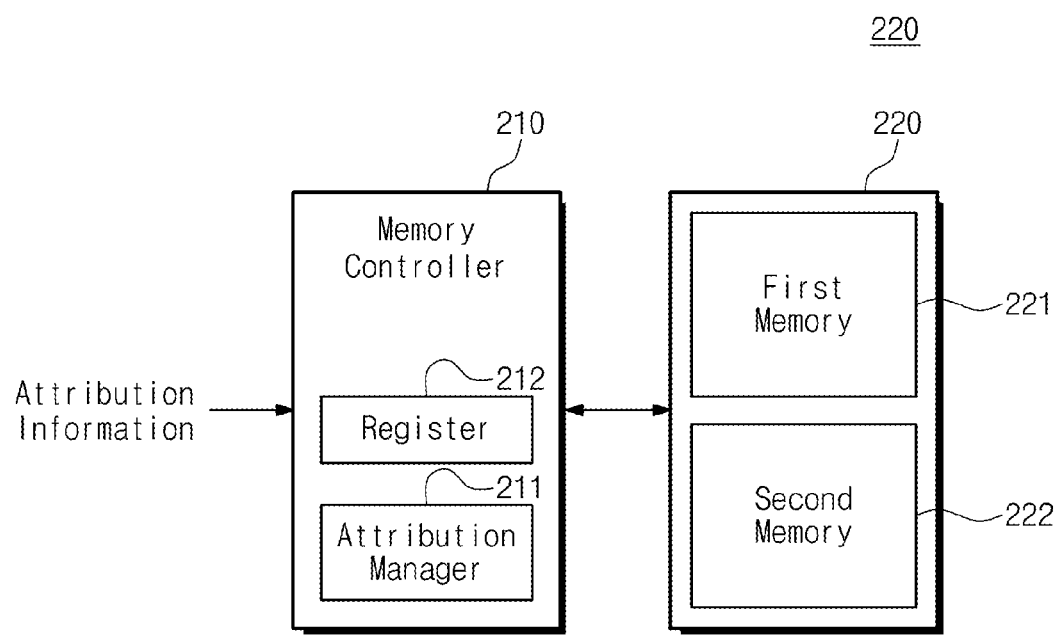
FIG. 5 is a block diagram illustrating a hybrid memory device in accordance with another embodiment of the inventive concept.
FIGS. 6 and 7 are respective tables listing exemplary flag bits.

FIG. 5 is a block diagram illustrating a hybrid memory device in accordance with another embodiment of the inventive concept. Referring to FIG. 5, a hybrid memory device 200 includes a memory controller 210 and a memory unit 220.

Here, the memory controller 210 further includes a register 212. An attribution manager 211 of the memory controller 210 may be used to generate and update an attribution information table that marks (e.g.,) a group state for all data stored in a first memory 221 in view of attribution information. Thus, the attribution manager 211 may copy and store part or all of the attribution information table into register 212 for reference.

In this context, data may be marked and managed according to a page unit, or a multiple page unit. The attribution information table may include a flag bit corresponding to each unit data stored in the first memory 221. In this manner, data stored in the first memory 221 may be marked (or identified) according to a group state, as described above (e.g., pinned (highest priority), normal (next highest priority), temporary (lowest priority) and use-completed (no priority)).

Figures 7, 8:
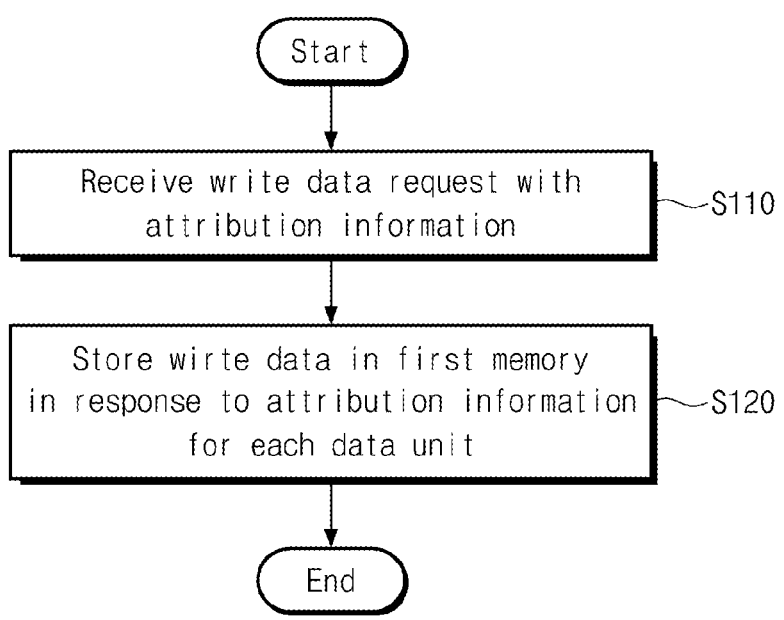
FIG. 8 is a flow chart summarizing a general data processing method for a memory system in accordance with embodiments of the inventive concept.

FIGS. 6 and 7 are respective tables illustrating exemplary flag bits that may be used to indicate corresponding data group states. In the table of FIG. 6, a single flag bit is used, while in the table of FIG. 7 two bits are used.

Referring to FIGS. 5 and 6, the attribution manager 211 may be used to set flag bit(s) according to attribution information associated with read/write data. Thus, with reference to the table of FIG. 6, the attribution manager 211 may set a flag bit value corresponding to either normal data (logical value '0') or unnecessary (e.g., use-completed) data (logical value '1'). Thus, the attribution manager 211 may be used to generate an attribution information table including flag bits corresponding to each unit data. Further, updated attribution information may be externally provided and the attribution manager 211 may be used to update flag bits included in the attribution information table.

Referring to FIGS. 5 and 7, the attribution manager 211 may be used to set flag bits on the basis of attribution information. Here, the attribution manager 211 will flag bits to '00' for normal data; '01' for unnecessary (use-completed) data; '10' for pinned data; and '11' for temporary data.

FIG. 8 is a flow chart summarizing in one example a general method of processing data in a memory system according to certain embodiments of the inventive concept.

In step S110, a write data request including corresponding write data and associated information is received.

In step S120, the write data is stored in a primary (or first selected) memory among a plurality of memories included in the hybrid memory device. Here, the primary memory may be a memory having the relatively high operating speed among the other memories, such as DRAM.

An operation of storing the write data in response to the write data request will be performed in view of the attribution information for data currently stored in the primary memory. Thus, as described above, storage of the write data may potentially be performed without necessarily performing a flush operation. Further, should a flush operation be required, the marking of related flush data may be performed according to various groups states indicated (or marked) for the stored data as corresponds with current data attribution information.

Figure 9:
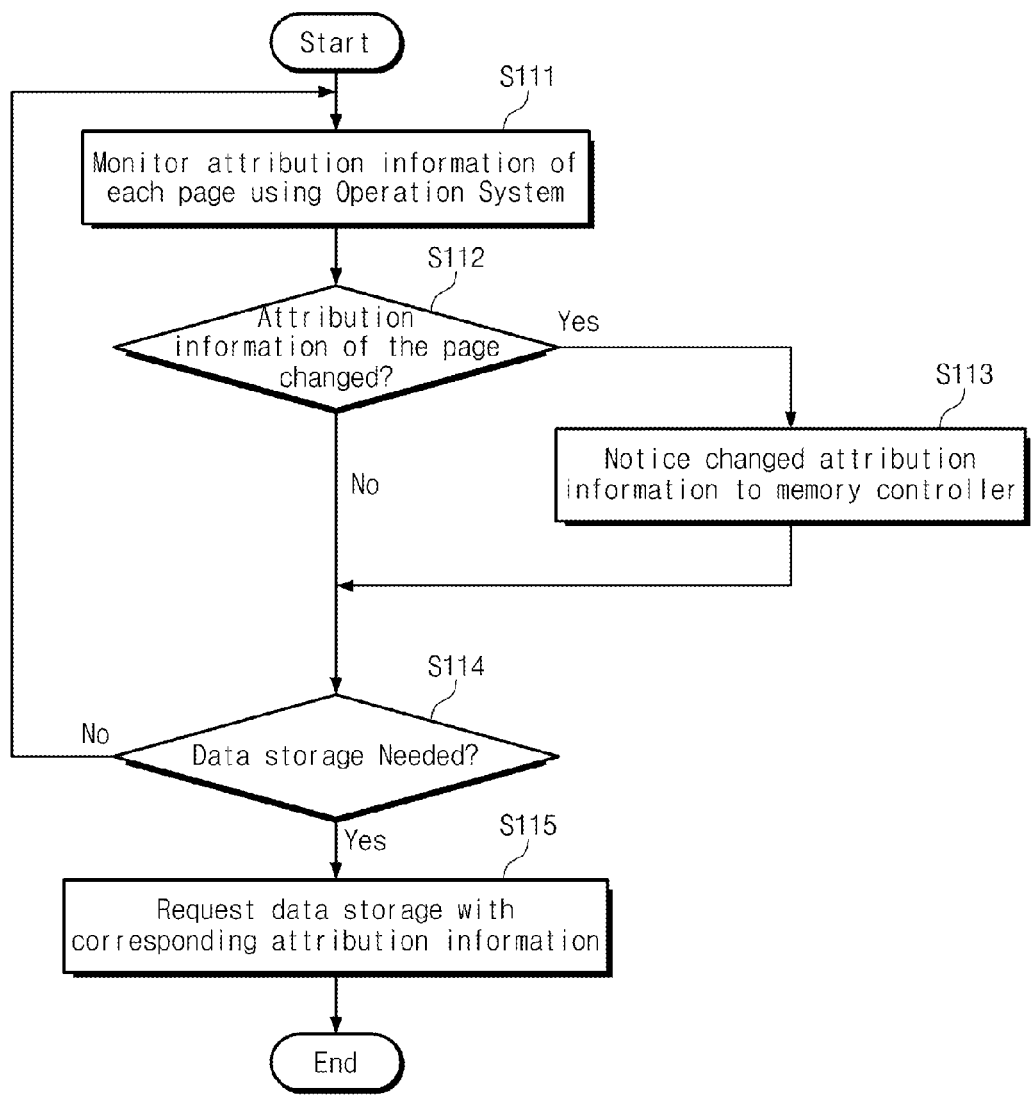
FIGS. 9 and 10 are flow charts further summarizing in selected examples certain steps of the method shown in FIG. 8.

FIG. 9 is a flow chart further illustrating exemplary method steps that may be used to assign attribution information to data in relation to step S110 of FIG. 8.

In step S111, attribution information of each data unit currently stored in a memory system is monitored using an operating system of a memory system. For example, data attribution information can be monitored according to a defined page unit.

Here, the operating system is assumed to include programming code capable of managing memory space for the primary memory. Thus, the operating system may readily monitor attribution information using an existing memory management code or designation scheme. For example, the operating system may monitor attribution information with reference to one or more page flag(s) or a page management list. The page management list referenced by the operating system may include a least recently used (LRU) list of page(s).

The attribution information may include information indicating whether or not certain data is used-completed, cache or temporary data, interrupt data, normal data, pinned data, etc. One or more application(s) running on the memory system may identify "immediate data" that requires fastest execution (e.g., a response speed) among other data that may refer to, or require the of the immediate data.

In step S112, a determination is made as to whether or not attribution information corresponding to certain data is updated. For example, in a case where a certain process is completed, related data may be indicated as use-completed (i.e. unnecessary) data among data being referenced by the terminated process. In such a case, attribution information associated with such data may be updated accordingly.

In step S113, if data having changed attribution information is detected, the changed attribution information will be notified to a memory controller. The changed attribution information may be periodically notified to the memory controller or in response to a request of the memory controller even the attribution information is not changed.

In step S114, a determination is made as to whether or not the data storage request should be performed. If there is the data storage request, in step S115, attribution information corresponding to the storage requested data is provided to the memory controller together with the write requested data.

Figure 10:
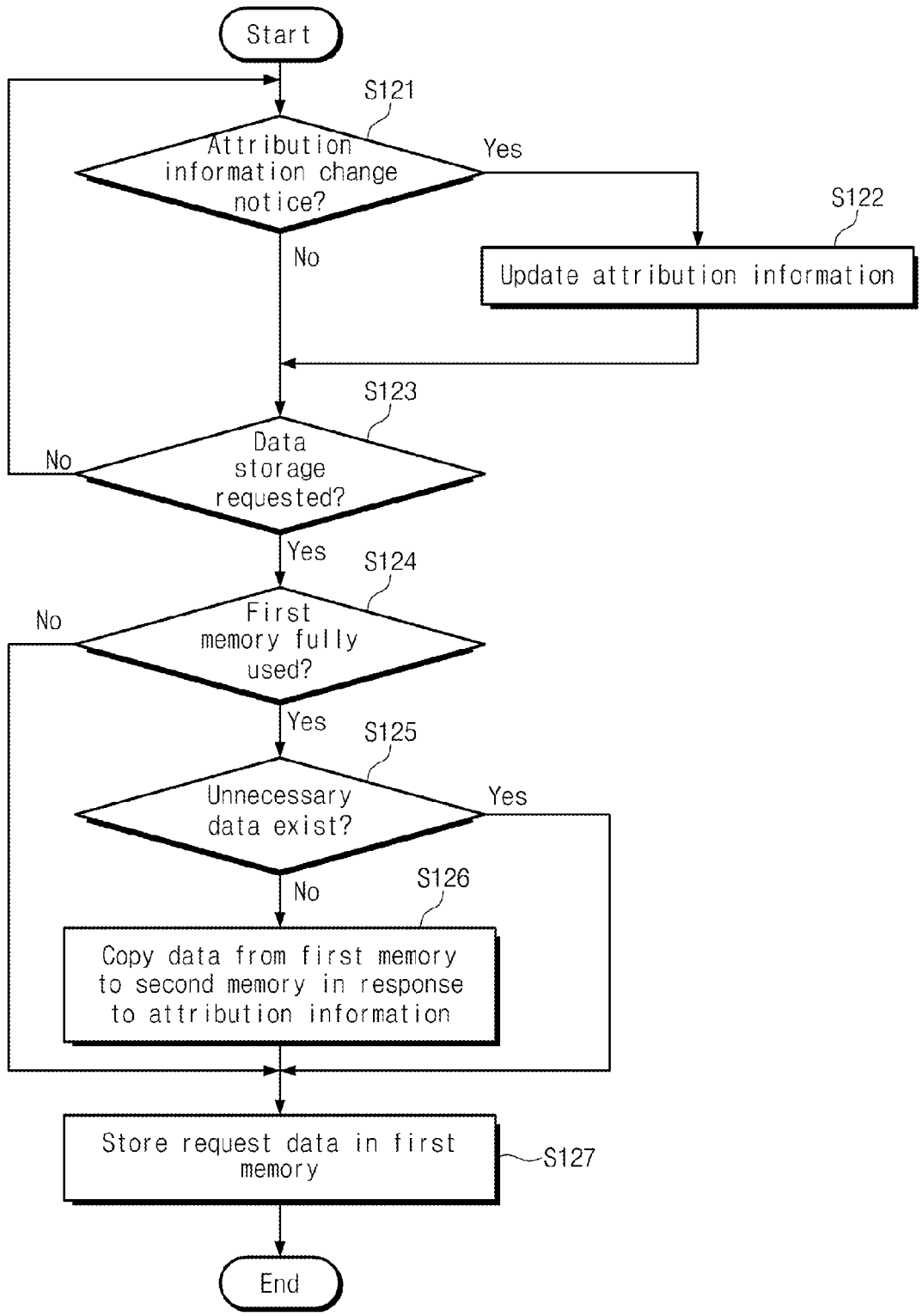

FIG. 10 is a flow chart further illustrating exemplary method steps that may be used to store data in relation to step S120 of FIG. 8.

In step S121, a determination is made as to whether or not attribution information change (update) has been notified (e.g.) to a memory controller. In the case where attribution information has been changed among data stored in the hybrid memory device 120, the attribution information change may be notified to an external destination (e.g., a memory controller).

In the case where attribution information change has been notified in step S122, marking information of data stored in the hybrid memory device 120 is changed in response to the notified attribution information. Otherwise, in step 123, a determination is made as to whether or not a data storage request has been made. In the case that the data storage is requested, data to be stored and attribution information corresponding to the data are provided from the outside.

In step S124, a further determination is made as to whether or not sufficient free space for storing the storage requested data exists in the first memory 121. In step S124, free space available for storing the storage requested (incoming write) data may include a space occupied by data marked as use-completed (i.e. unnecessary). Thus, in step S124, free space available for storing the storage requested data may include space occupied by data marked with temporary. If sufficient free space exists, in step S127, the storage requested data will be stored in the first memory 121.

Next, in step S125, a further determination is made as to whether or not data marked as unnecessary exists in the first memory 121. In the case that free space occupied by data marked with unnecessary is greater than a size of the storage requested data, the hybrid memory device 120 may immediately overwrite the storage requested data in a place in which the data marked with unnecessary is stored without a flush operation.

In the case where free space occupied by data marked as unnecessary is smaller than a size of the storage requested data, in step S126, a part of data stored in the first memory 121 is copied to the second memory 122 using a flush operation until sufficient free space in the first memory 121 is secured.

Data being copied to the second memory 122 during a flush operation may be selected in response to its groups state designation (or group state marking). Data marked as pinned will be excluded from copy target data or can be relegated to a last free space designation.

In step S127, the storage requested data is stored in the secured free space of the first memory 121.

According to a storage operation of the data, when data is stored in the first memory 121, low priority data (e.g., use-completed) may be immediately overwritten without execution of a flush operation to secure more free space. In addition, since data stored in the first memory 121 can be managed based on its attribution information, the "flushing" of low priority data may be reduced.

Figure 11:
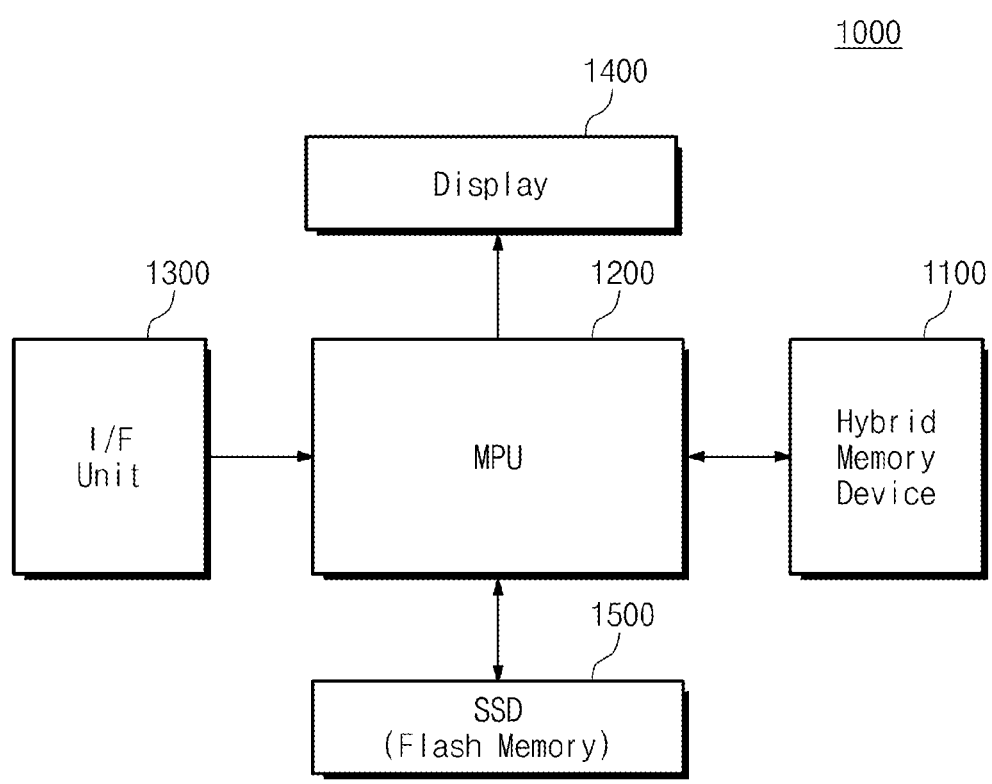
FIGS. 11, 12 and 13 are respective block diagrams illustrating various computational systems that may include a memory system consistent with an embodiment of the inventive concept.

FIG. 11 is a block diagram illustrating an application of the inventive concept applied to a mobile device.

Referring to FIG. 11, a mobile device (e.g., a notebook, or a portable electronic device) may include a hybrid memory device 1100, a micro processing unit (MPU) 1200, an interface unit 1300, a display 1400 and a solid stage drive 1500 (SSD).

The hybrid memory device 1100 can manufacture or package the MPU 1200 and the SSD 1500 in one chip. The hybrid memory device 1100 and the SSD 1500 can be embedded in the mobile device.

The mobile device may be a portable communication device. In this case, a modem and transceiver that perform a transmission and reception of communication data and modulation and demodulation of data can be connected to the interface unit 1300.

The hybrid memory device 1100 is connected to the MPU 1200 and can function as a main memory of the MPU 1200. The hybrid memory device 1100 may include a plurality of memories having different read/write characteristics like the hybrid memory device of FIG. 1. The hybrid memory device 1100, when data is stored in a first memory having the highest speed among the memories, can overwrite new data in a space in which unnecessary data is stored without a flush operation. In addition, since the hybrid memory device 1100 can manage data stored in the first memory on the basis of attribution of the data, movement of unnecessary data can be reduced.

The MPU 1200 controls an overall operation of the mobile device according to the program previously set.

The display 1400 is a liquid crystal device having a backlight, a liquid crystal device having a LED light source or an OLED device and may have a touch screen. The display 1400 functions as an output device displaying an image such as a character, a number, a picture, etc. by a color.

The SSD 1500 may be a NOR type flash memory or a NAND type flash memory. In FIG. 11, the SSD is adopted as a storage device but the type of storage device of the inventive concept is not limited to this example. The storage device of the inventive concept may include various kinds of nonvolatile storages. The nonvolatile storage can store data information having various data forms such as a text, a graphic, a software code, etc.

The nonvolatile storage can be embodied by an electrically erasable programmable read-only memory (EEPROM), a flash memory, a magnetic random access memory (MRAM), a spin-transfer torque MRAM, a conductive bridging RAM (CBRAM), a ferroelectric RAM (FeRAM), a phase change RAM (PRAM) which is called an ovonic unified memory (OUM), a resistive RAM (RRAM), a nanotube RRAM, a polymer RAM (PoRAM), a nanotube floating gate memory (NFGM), a holographic memory, a molecular electronics memory device, or an insulator resistance change memory.

The mobile device is described to be oriented to a mobile communication device but if necessary, the mobile device can function as a smart card by adding and subtracting constituent elements.

The mobile device can be connected to an external communication device through a separate interface. The communication device may be a DVD player, a computer, a set top box, a game machine, a digital camcorder, etc.

The mobile device may further include an application chipset, a camera image processor CIS, a mobile DRAM, etc.

Chips forming the mobile device can be mounted using various types of packages such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

Figure 12:
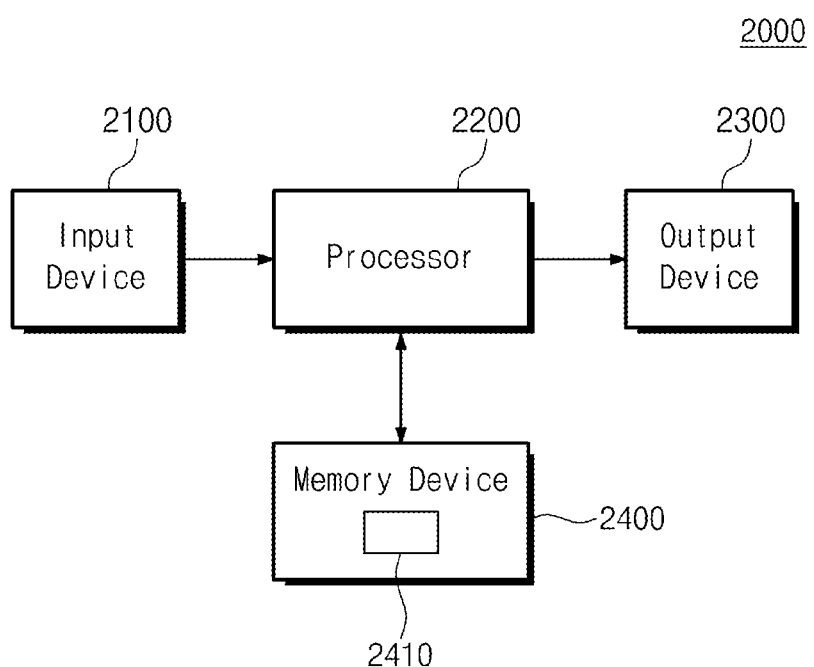

FIG. 12 is a block diagram illustrating an application of the inventive concept applied to an electronic system. As described in FIG. 12, the electronic system 2000 includes an input device 2100, a processor 2200, an output device 2300 and a memory device 2400. The memory device 2400 may include a hybrid memory device 3410 having the structure such as illustrated in FIG. 1. The hybrid memory device 2410 may be integrated into any one of the input device 2100, the processor 2200, and the output device 2300.

In FIG. 12, the hybrid memory device 2410 may include a plurality of memories having different read/write characteristics like the hybrid memory device of FIG. 1. When data is stored in a first memory having a high speed among the memories, the hybrid memory device 2410 can overwrite new data in a space in which unnecessary data is stored without a flush operation. In addition, since the hybrid memory device 2410 can manage data stored in the first memory on the basis of attribution of the data, movement of unnecessary data can be reduced.

Figure 13:
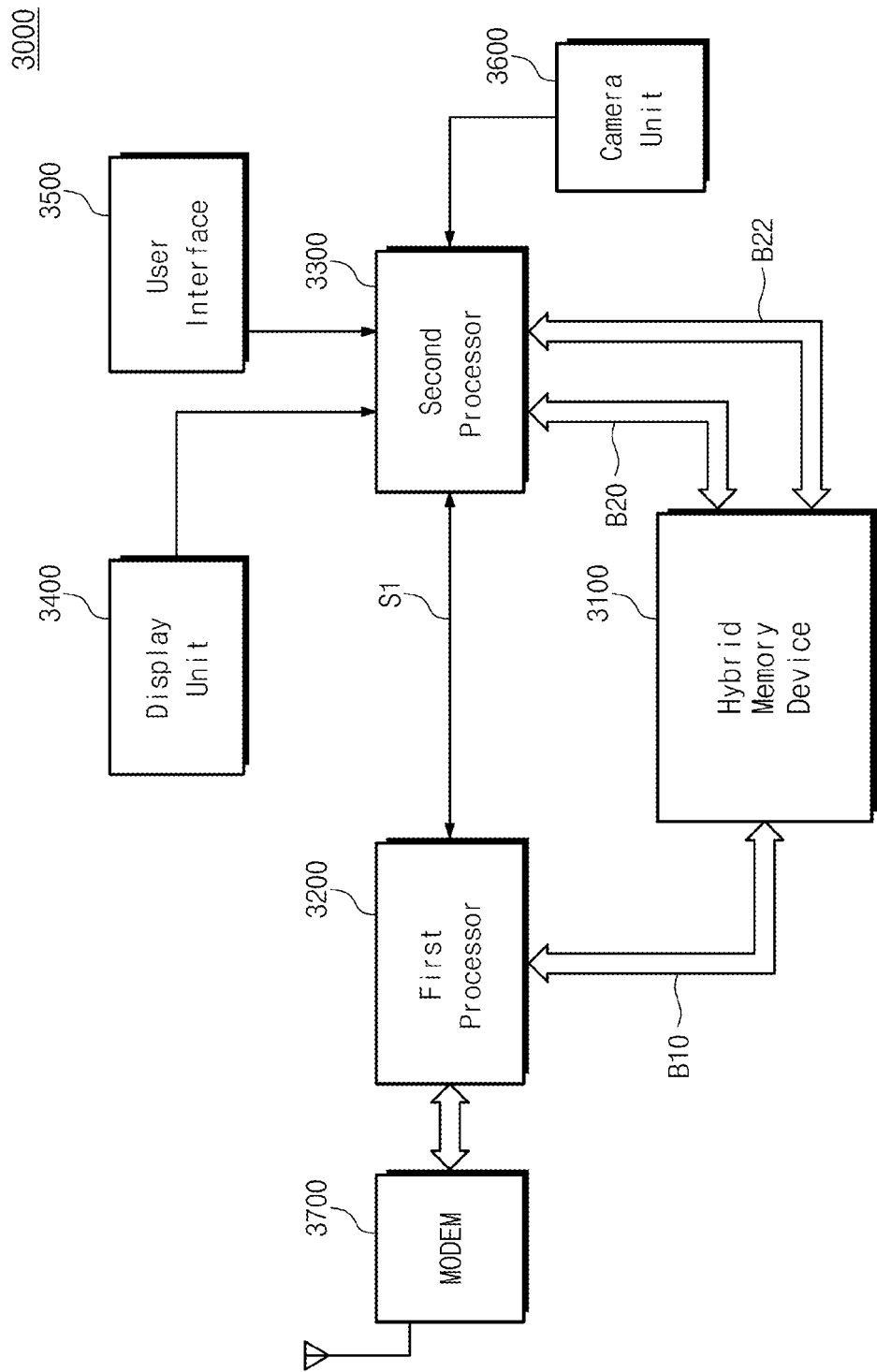

FIG. 13 is a circuit illustrating an application of the inventive concept applied to a portable device.

Referring to FIG. 13, a portable device 3000 that can function as a smart phone may include a hybrid memory device 3100, a first processor 3200, a second processor 3300, a display unit 3400, a user interface 3500, a camera unit 3600 and a modem 3700.

The hybrid memory device 3100 has three ports connected to first through third buses B10, B20 and B22 and is connected to the first and second processors 3200 and 3300. The first port of the hybrid memory device 3100 is connected to the first processor 3200 that may be a baseband processor through the first bus B10 and the second port of the hybrid memory device 3100 is connected to the second processor 3300 that may be an application processor through the second bus B20. The third port of the hybrid memory device 3100 is connected to the second processor 3300 through the third bus B22.

The hybrid memory device 3100 may include a plurality of memories having different read/write characteristics like the hybrid memory device of FIG. 1. When data is stored in a first memory having a high speed among the memories, the hybrid memory device 3100 can overwrite new data in a space in which unnecessary data is stored without a flush operation. In addition, since the hybrid memory device 3100 can manage data stored in the first memory on the basis of attribution of the data, movement of unnecessary data can be reduced.

An interface of the first bus B10 may be a volatile memory interface and the first port can receive first packet data generated from the first processor 3200 to transmit it to an internal circuit block of the hybrid memory device 3100.

The first port can provide first data of the hybrid memory device 3100 to the first processor 3200. In this case, the first data may be parallel data.

An interface of the third bus B22 may also be a volatile memory interface and the third port can receive third packet data generated from the second processor 3200 to transmit it to an internal circuit block of the hybrid memory device 3100. The third port can provide third data of the hybrid memory device 3100 to the second processor 3300.

An interface of the second bus B20 may be a nonvolatile memory interface such as a NAND flash and the second port can receive second packet data generated from the second processor 3300 to transmit it to an internal circuit block of the hybrid memory device 3100. The second port can provide second data of the hybrid memory device 3100 to the second processor 3300. In this case, the second data may be serial or parallel data.

An interface of the buses may be one of various interface protocols such as a USB (universal serial bus), a MMC (multimedia card), a PCI-E (PCI-express), a SAS (serial attached SCSI), a SATA (serial advanced technology attachment), a parallel-ATA, a SCSI (small computer small interface), an ESDI (enhanced small disk interface), an IDE (integrated drive electronics), etc.

In some cases, the first and second processors 3200 and 3300 and the hybrid memory device 3100 can be manufactured or packaged in one chip. The hybrid memory device 3100 may also be embedded in the mobile device.

In the case that a portable device is a smart phone, the modem 3700 performing functions of transmission/reception of communication data and modulation/demodulation of data may be connected to the first processor 3200.

A NOR type or NAND type flash memory can be additionally connected to the first processor 3200 or the second processor 3300 to store large amounts of information.

The display unit 3400 is a liquid crystal device having a backlight, a liquid crystal device having a LED light source or an OLED device and may have a touch screen. The display 1400 functions as an output device displaying an image such as a character, a number, a picture, etc. by a color.

The portable device 3000 is described to be oriented to a smart phone device but if necessary, the portable device 3000 can function as a smart card by adding and subtracting constituent elements.

The portable device 3000 can be connected to an external communication device through a separate interface. The communication device may be a DVD player, a computer, a set top box, a game machine, a digital camcorder, etc. The camera unit 3600 includes a camera image processor CIS and can be connected to the second processor 3300.

The portable device 3000 may further include an application chipset, a mobile DRAM, etc.

According to a hybrid memory device, a memory system including the hybrid memory device and a data processing method thereof, since a data storage operation is controlled in response to attribution information of the data, the data can be effectively stored.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A hybrid memory device comprising:
a first memory operating according to a first speed and configured for use as a primary memory to receive and store write data and assigned attribution information;
a second memory operating according to a second speed slower than the first speed of the first memory and providing greater data storage capacity than the first memory; and
a memory controller configured to:
perform a flush operation that secures additional free space in the first memory by copying data stored in the first memory to the second memory,
receive the attribution information associated with certain data from the host,
classify the data stored in the first memory into a plurality of group states based on the attribution information associated with the data to be stored in the first memory, wherein the plurality of group states range from a lowest priority to a highest priority,
upon receiving a write data request including the write data, determine whether sufficient free space exists in the first memory to store the write data, and upon determining that insufficient free space exists in the first memory, overwrite data assigned a lowest priority group state with the write data, and
change, in response to completing a process executed upon previous write data written into the first memory, attribution information assigned to the previous write data to reflect that space storing the previous write data within the first memory is free space that is available to be overwritten without copying the previous write data from the first memory to the second memory.

2. The hybrid memory device of claim 1, wherein the memory controller is further configured to execute the flush operation in response to determining that insufficient free space exists in the first memory.

3. The hybrid memory device of claim 1, wherein the memory controller is further configured to immediately write the write data into the first memory in response to determining that sufficient free space exists in the first memory.

4. The hybrid memory device of claim 1, wherein the plurality of group states comprises a highest priority group state, the lowest priority group state, a second highest priority group state, and a second lowest priority group state.

5. The hybrid memory device of claim 4, wherein the other data overwritten by the memory controller includes data that is assigned both the lowest priority group state and the second lowest priority group state.

6. The hybrid memory device of claim 4, wherein:
the memory controller is configured to reference an attribution information table, and
each data unit stored in the first memory has corresponding flag bits, within the attribution information table, indicating an assigned group state among the group states for the data unit.

7. The hybrid memory device of claim 6, wherein the memory controller is further configured to update the attribution information table in response to completion of the process.

8. The hybrid memory device of claim 1, wherein the memory controller is further configured to execute the flush operation in response to an externally-provided command.

9. The hybrid memory device of claim 1, wherein the memory controller is further configured to periodically execute the flush operation.

10. The hybrid memory device of claim 1, wherein the second speed is slower than the first speed.

11. The hybrid memory device of claim 1, wherein a first of the group states is a highest priority group state, a second of the group states is the lowest priority group state, and a third of the group states is an intermediate group state between the highest priority group state and lowest priority group state.

12. In a memory system including a control unit and a hybrid memory device, the hybrid memory device including a memory controller, a first memory operating according to a first speed and a second memory operating according to a second speed slower than the first speed of the first memory and providing greater data storage capacity than the first memory, a method of re-allocating memory space in the first memory during execution of a write operation comprises:
  referencing an attribute information table listing respectively assigned group states for first data, second data and third data stored in the first memory, wherein the first data is assigned a first priority group state among the group states, the second data is assigned a second priority group state among the group states having a priority lower than that of the first priority group state, and the third data is assigned a third priority group state among the group states having a priority lower than that of the second priority group state;
  in response to a received write data request including fourth data, determining whether sufficient free space exists in the first memory to store the fourth data;
  in response to determining that sufficient free space exists in the first memory to store the fourth data, storing the fourth data in the first memory;
  in response to determining that sufficient free space does not exist in the first memory to store the fourth data, re-allocating memory space in the first memory by overwriting the third data with at least a portion of the fourth data; and
  changing, in response to completing a process executed upon previous write data written into the first memory, attribution information assigned to the previous write data to reflect that space storing the previous write data within the first memory is free space that is available to be overwritten without copying the previous write data from the first memory to the second memory.

13. The method of claim 12, further comprising:
  completing a data processing operation in the memory system directed to the stored first data that changes attribution information associated with the stored first data by monitoring of the attribution information using an operating system running on the memory controller; and
  changing the first group state assigned to the stored first data to a different group state.

14. The method of claim 12, further comprising:
  upon determining that sufficient free space does not exist in the first memory for a residual portion of the fourth data other than the fourth data overwriting the third data, executing a flush operation that copies at least the stored second data from the first memory to the second memory; and thereafter,
  storing the residual portion of the fourth write data in the first memory.

\* \* \* \* \*